United States Patent [19]

Trebnick

[11] Patent Number: 4,878,734

[45] Date of Patent: Nov. 7, 1989

[54] BICYCLE WHEEL ACTIVATED REFLECTOR

[76] Inventor: Ralph J. Trebnick, P.O. Box 23, Bovey, Minn. 55709

[21] Appl. No.: 210,091

[22] Filed: Jun. 22, 1988

[51] Int. Cl.⁴ .............................................. G02B 5/12
[52] U.S. Cl. ...................................... 350/99; 116/56
[58] Field of Search ................ 350/99, 107, 109, 613; 40/587, 591; 116/46, 56; 301/5 P

[56] References Cited

U.S. PATENT DOCUMENTS

| 3,439,926 | 4/1969 | Bayard | 116/56 |
| 3,478,713 | 11/1969 | Brams | 116/56 |
| 3,528,721 | 9/1970 | La Londe | 350/99 |
| 4,105,286 | 8/1978 | Curran | 350/99 |

Primary Examiner—Bruce Y. Arnold
Assistant Examiner—Loha Ben
Attorney, Agent, or Firm—Faegre & Benson

[57] ABSTRACT

A wheel activated bicycle reflector attachment is rotated with and by the rotation of the bicycle wheel, reflecting a rotating or flashing pattern of light to oncoming traffic. The apparatus is adjustable to various size bicycles by means of a telecopic shaft and a pivoted bracket. A drive wheel, supported by the bracket, is rotated with and by rotation of the rear bicycle wheel and thus rotates reflectors connected to the drive wheel. The drive wheel axis of rotation is located rearwardly of the rear wheel axis of rotation to insure constant, positive engagement with the rear bicycle wheel.

7 Claims, 1 Drawing Sheet

U.S. Patent
Nov. 7, 1989
4,878,734
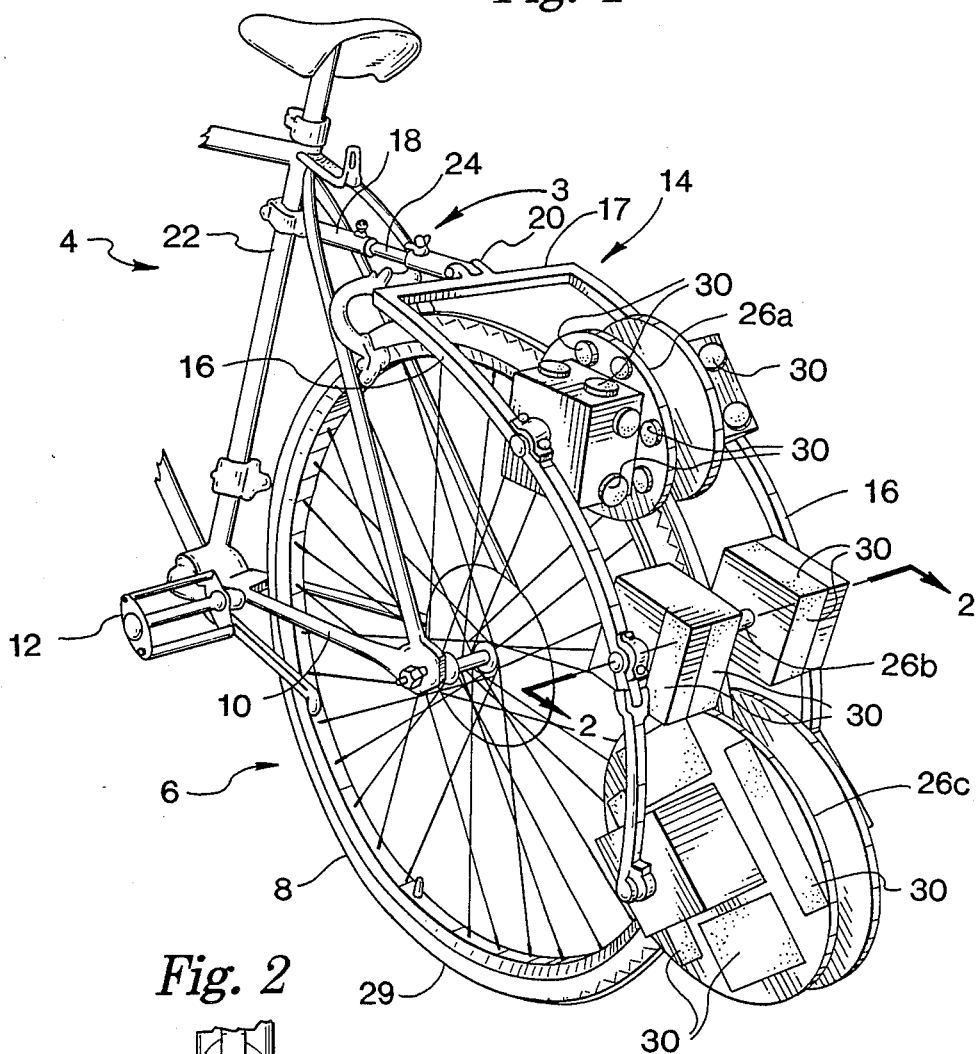
Fig. 1
Fig. 2
Fig. 3
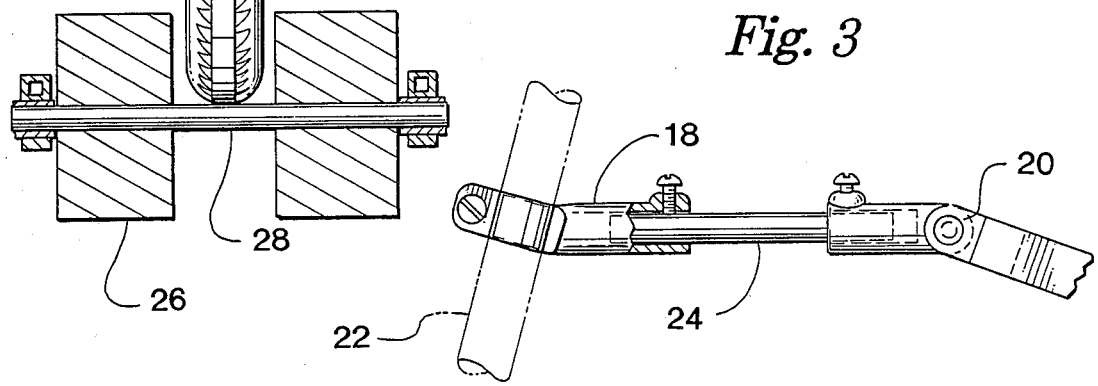

BICYCLE WHEEL ACTIVATED REFLECTOR

BACKGROUND OF THE INVENTION

1. Field of the Invention

This invention relates to a wheel activated reflector device, which is relatively simple and efficient in both design and function, for use with standard size bicycles or similar wheeled vehicles. The present reflector provides increased visibility for the bicycle at night or under circumstances of reduced visibility without the necessity of batteries or other auxiliary power sources. The present reflector also is able to reflect incident light in a pulsating, flashing or rotating signal, which provides an increased safety factor by attracting more attention than a stationary light.

Many accidents of motor vehicles colliding with bicyclists occur during the night or other periods of decreased visibility. Although many bicycles come equipped with stationary reflectors, these do not often provide sufficient visibility for the bicycle to oncoming, following or cross-traffic vehicles.

2. Description Of the Prior Art

There are a number of currently available bicycle reflectors, but none of them provides the combination of features and advantages found in the present inventive wheel activated reflector.

U.S. Pat. No. 3,528,721, La Londe, shows a generally U-shaped bracket which is pivotally mounted on the rear wheel fork of a bicycle frame, and which supports a drive wheel having a shaft. As the rear tire of the bicycle turns, the drive wheel carried by the shaft makes contact with the bicycle tire and rotates therewith, causing the reflector members of the shaft on each end thereof to spin and reflect incident light. La Londe requires that the drive wheel is disposed in a vertical plane which is forward of, or even with the axis of the bicycle wheel. Because of this positioning of the drive wheel in a vertical plane forward of or even with the bicycle rear wheel axis, a spring means is necessary to cause operative contact between the bicycle rear wheel and the drive wheel.

U.S. Pat. No. 4,047,800, DiBease, shows a reflector disc using a wheel member about the periphery. A mounting plate provides connection with the bicycle's rear axle and, as the bicycle wheel rotates, the reflector member, which is disposed substantially vertically and substantially perpendicular to the plane of the rear wheel will also rotate, causing the reflector members of the disc to reflect the light from oncoming vehicles. The rotation of the bicycle wheel causes the rotating action of the reflector.

U.S. Pat. No. 4,105,286, Curran, describes a rather complex reflector system to be mounted on the front end only of a bicycle, and which uses a drive wheel to engage the front tire of the bicycle and to be rotated thereby. Turning of the drive wheel causes spinning of the reflector blades, which in turn provides reflection of light of oncoming vehicles.

U.S. Pat. No. 4,046,098, Mancinelli, et al., also shows a rather complicated bicycle reflection system wherein the rotational action of the bicycle wheel causes a subsequent rotation of the reflection faces of the rotating prism, and thus reflects the light of oncoming vehicles.

SUMMARY OF THE INVENTION

This invention relates to an improved bicycle reflector device which is rotated with and by the rotation of the bicycle wheel, thus reflecting incident light in a rotating or flashing pattern to oncoming traffic. The present reflector includes a bracket, pivotally secured to the bicycle frame, with the bracket adjoining the periphery of the rear bicycle wheel. The pivot may further be connected to the bicycle frame by a shaft. The shaft may be provided with a telescoping mechanism to allow the reflector to be adjustable for different size bicycle frames and wheels. The pivot is supported on an axis substantially parallel to the rear bicycle wheel transverse supPort axis. The bracket supports one or more drive wheels engaging the rear bicycle wheel periphery for rotation by and with the rotation of the rear bicycle wheel. The axis of rotation of the drive wheel is located rearwardly of the rear wheel axis of rotation. Operably connected to the drive wheel and rotatable therewith are one or more reflecting means. The reflecting means rotatingly reflect incident light in accordance with the rotation of the rear bicycle wheel, thus emitting to oncoming traffic a pattern of rotating light from the side of the bicycle, and a pattern of flashing light from the front or rear of the bicycle.

BRIEF DESCRIPTION OF THE DRAWINGS

FIG. 1 is a perspective view of the rear fragment of a typical bicycle having a bicycle wheel activated reflector attachment of this invention attached thereto.

FIG. 2 is a top plan sectional view taken along line 2—2 in FIG. 1.

FIG. 3 is a left side elevational detail taken from the area indicated at 3 in FIG. 1.

DETAILED DESCRIPTION OF THE INVENTION

The wheel activated reflector attachment 2 of this invention is designed for attachment to a bicycle 4, a rear portion of which is indicated in the drawings.

The rear wheel 6 is rotatable about its axis 8, and is usually driven by a chain 10 extending about a sprocket and rotated by rotation of foot pedals 12. The reflector attachment 2 includes a generally U-shaped bracket 14, the arms 16 of which are generally parallel to each other and may desirably be curved to generally follow the curvature of the rear wheel 6. The arms 16 of the U-shaped bracket 14 are connected at their rear ends by a cross-connecting member 17. The bracket 14 is pivotally connected to a shaft 18 by pivot connecting means 20. The pivot 20 allows the present reflector attachment to pivot to fit bicycles of various frame and wheel sizes and also provides resiliency to the reflector attachment, as when the bicycle is ridden over bumpy or rough terrain. The shaft 18 is secured to the frame of the bicycle 4 adjacent the rear wheel 6 thereof, for example, as illustrated in FIG. 1, to the seat support tube 22. The shaft 18 may desirably be provided with a telescoping mechanism 24 to accommodate the present inventive reflector device to bicycles of differing size frames and wheels, as illustrated in FIG. 1 and in the detail of FIG. 3.

At least one drive wheel 26 is supported by its axle 28 extending normally to the arms 16 of the bracket 14. Each drive wheel 26 is designed to ride upon the periphery of the rear wheel 6, as shown in FIG. 1 and in the sectional detail of FIG. 2. When more than two drive wheels 26a and 26b are provided, a spanker pivot 29 as illustrated in FIG. 1, may desirably be provided to permit the arms 16 of the reflector attachment 2 to adjust to wheels 6 of different diameter. The axle 28 of each drive wheel 26 is located rearwardly of the rear wheel axis 8. This allows the downward gravitational force of the drive wheel 26 to act against the upward force of the rotating bicycle wheel 6 when the bicycle travels in the normal forward direction, maintaining secure and continuous contact of the reflector drive wheel 26 with the rotating bicycle wheel 6. The surface of the drive wheel axle 28 at the area of contact with the rear wheel 6 may suitably be provided with a textured or burred finish to ensure better contact with the rear wheel 6.

Each drive wheel 26 supports one or more reflecting elements 30 which are provided with reflective material to reflect incident light forward, behind and to either side of the bicycle. The reflecting elements 30, as illustrated in the embodiment shown in FIG. 1, may be of any desirable configuration, including round, rectangular, as shown by 26b, and combinations thereof 26a and 26c. Alternatively, the reflecting elements 30 may also be in the form of tubular or cylindrical rollers having slots to receive fins of reflective material. In the slotted embodiment, any reflective fins which may become broken under use conditions can be removed and replaced without the necessity of removing the entire reflector attachment.

Reflection of incident light forward or behind a bicycle equipped with the reflecting attachment of this invention would thus provide the visual appearance of a flashing or blinking light. From the side of a bicycle equipped with the reflecting attachment of this invention, the visual appearance of the reflected light would be that of curling rotation. Such signals are readily apparent to oncoming traffic.

As will be obvious to those of skill in this area, the present wheel activated reflector attachment can readily be used with other types of wheeled vehicles, such as for example, motorized bicycles and motorcycles. This reflector attachment affords an effective and economical means for assuring the visibility of bicycles and similar vehicles in conditions of darkness and reduced visibility. Only certain embodiments of this invention have been illustrated and described herein, but various modifications and changes may be made without departing from the scope of this invention as recited in the following claims.

What is claimed is:

1. A reflector apparatus for a bicycle comprising
   a bracket secured by a shaft to a frame of the bicycle adjoining the periphery of a rear wheel thereof;
   means pivotally connecting the bracket to the shaft, such that the axis of the pivotal connecting means is substantially parallel to the rear wheel transverse support axis of rotation;
   at least a first drive wheel means axially supported by the bracket and operatively engaging the rear wheel periphery for rotation therewith, the drive wheel means having an axis of rotation located rearwardly of the rear wheel axis of rotation;
   at least one reflecting means operatively connected to the first drive wheel means and rotatable therewith, the reflecting means rotatingly reflecting incident light away from the bicycle.

2. A reflector apparatus according to claim 1, wherein the shaft is provided with a longitudinally variable telescoping means.

3. A reflector apparatus according to claim 1, further comprising a plurality of drive wheel means and a plurality of reflecting means.

4. A reflector apparatus according to claim 3, wherein the plurality of drive wheel means is three and wherein the bracket is further provided with a spanker pivot connecting means between the second and third drive wheels means.

5. A reflector apparatus according to claim 1, wherein the bracket is formed with a parallel pair of arms generally conforming to the shape of the periphery of the rear wheel.

6. A wheel-activated reflector attachment for a bicycle comprising:
   a bracket pivotally connected to a frame of the bicycle and extending rearwardly over a rear wheel of the bicycle, the pivotal connecting axis being substantially parallel to the rear wheel transverse support axis of rotation;
   at least one roller means axially supported by the bracket on an axis substantially parallel to the rear wheel transverse support axis for rotation with and by rotation of the rear wheel, the roller means axis of rotation located rearwardly of the rear wheel axis of rotation;
   at least one reflecting means operatively connected to the roller means for rotation therewith and reflecting incident light away from the bicycle.

7. A reflector attachment for a wheeled vehicle comprising:
   a bracket hingedly connected by a shaft to a rear portion of a frame of the wheeled vehicle to extend over a rear wheel thereof;
   the axis of the hinged connection being generally parallel to the rear wheel transverse support axis of rotation;
   at least one roller means, axially supported by the bracket on an axis substantially parallel to the rear wheel transverse support axis and engaging the periphery of the rear wheel for rotation thereof, the roller means axis of rotation located rearwardly of the rear wheel axis of rotation;
   at least one reflecting means secured to the roller means and reflecting incident light away from the wheeled vehicle.

* * * * *